United States Patent [19]
Cowan II et al.

[11] Patent Number: 5,287,392
[45] Date of Patent: Feb. 15, 1994

[54] INTERNAL PASSIVE WATER RECOMBINER/HYDROGEN PEROXIDE DECOMPOSER FOR A BOILING WATER REACTOR

[75] Inventors: Robert Lee Cowan II; Robert J. Law, both of Livermore; James E. Charnley, Gilroy; Robert J. Brandon, San Jose, all of Calif.

[73] Assignee: General Electric Company, San Jose, Calif.

[21] Appl. No.: 981,667

[22] Filed: Nov. 25, 1992

[51] Int. Cl.$^5$ .............................. G21C 19/317
[52] U.S. Cl. .................... 376/301; 423/579; 423/584
[58] Field of Search ............... 376/301, 300; 423/580, 423/584, 579

[56] References Cited

U.S. PATENT DOCUMENTS

| | | | |
|---|---|---|---|
| 2,721,788 | 10/1955 | Schad | 423/579 |
| 2,863,729 | 12/1958 | McDuffie | 23/204 |
| 2,945,794 | 7/1960 | Winters et al. | 204/154.2 |
| 2,961,391 | 11/1960 | King | 204/193.2 |
| 3,284,305 | 11/1966 | Urey et al. | 376/301 |
| 3,663,725 | 5/1972 | Pearl | 376/306 |
| 3,986,839 | 10/1976 | Queiser et al. | 376/301 |
| 4,014,984 | 3/1977 | Parnes | 376/301 |
| 4,171,350 | 10/1979 | Sanders | 423/580 |

(List continued on next page.)

FOREIGN PATENT DOCUMENTS

0467110 6/1991 European Pat. Off. .

OTHER PUBLICATIONS

Rao et al., "Protective coatings for radiation control etc.," J. Vac. Sci. Technol. A 5(4), Jul/Aug. 1987, pp. 2701–2705.
Kim et al., "The Application of Noble Metals in Light-Water Reactors", JOM, Apr. 1992, pp. 14–18.
Niedrach, "Effect of Palladium Coatings on the Corrosion Potential of Stainless Steel etc.", Corrosion, vol. 47, No. 3 (1991), pp. 162–169.
Rogers et al., "Catalytic recombiners for BWRs", Nucl. Eng. Int'l, Sep. 1973, pp. 711–715.
Indig et al., "Mitigation of SCC in an operating BWR via H$_2$ injection", Int'l Corrosion Forum, Anaheim, Apr. 1983.
Jones et al., "Controlling SCC in BWR Piping by Water Chemistry Modification", NACE Symposium, Corrosion 1984, New Orleans, 1984.
Cowan et al., "U.S. Experience with Hydrogen Water Chemistry in BWRs", Japan Atomic Ind. Forum Water Chem. Conf., Tokyo (1988).
Cowan et al., "Experience with hydrogen water chem- (List continued on next page.)

*Primary Examiner*—Daniel D. Wasil
*Attorney, Agent, or Firm*—J. S. Beulick

[57] ABSTRACT

An internal passive catalytic device operating in the water phase of a boiling water reactor vessel downstream of the steam/water separator location. The device consists of catalytic material arranged and situated such that all (except perhaps a small leakage flow) water phase exiting the water/steam separator device flows over the surface of the catalytic material. The catalytic surfaces decompose dissolved hydrogen peroxide into water and oxygen. When the substrate of the catalytic material is plated or alloyed with a water recombination catalyst such as a noble metal, the catalytic surfaces also catalyze the recombination of dissolved hydrogen and oxygen molecules into water. The passive catalytic device is constructed to ensure that the pressure drop of the reactor water across the device is very small. The device includes a stainless steel flow-through housing packed with catalytic material, which could take the form of tangled wire or strips, crimped ribbon, porous sintered metal composite or any other structure having a high surface area-to-volume ratio.

13 Claims, 9 Drawing Sheets

U.S. PATENT DOCUMENTS

| | | | |
|---|---|---|---|
| 4,226,675 | 10/1980 | Lewis et al. | 376/301 |
| 4,246,235 | 1/1981 | Rogers | 376/301 |
| 4,282,062 | 8/1981 | Stiefel et al. | 376/306 |
| 4,374,083 | 2/1983 | Deinlein et al. | 376/306 |
| 4,574,071 | 3/1986 | deSilva et al. | 422/14 |
| 4,752,461 | 6/1988 | Coeckelberghs et al. | 423/579 |
| 4,789,488 | 12/1988 | deSilva | 210/750 |
| 4,842,811 | 6/1989 | Desilva | 376/301 |
| 5,130,081 | 7/1992 | Niedrach | 376/305 |
| 5,135,709 | 8/1992 | Andresen et al. | 376/305 |
| 5,147,602 | 9/1992 | Andresen et al. | 420/35 |
| 5,164,152 | 11/1992 | Kim et al. | 376/305 |

OTHER PUBLICATIONS istry etc.", Water Chem. for Nucl. Reactor Systems 4, BNES, London (1986), 29–36.

Ullberg et al., "Hydrogen Peroxide in BWRs", Water Chem. for Nucl. Reactor Systems 4, BNES, London (1987), pp. 67–73.

Ruiz et al., "Model Calculations of water radiolysis in BWR primary coolant, "Water Chem. of Nucl. Reactor Systems 5, BNES, London (1989), pp. 131–140.

BWR Hydrogen Water Chemistry Guidelines: 1987 Revision, EPRI NP–4947–SR, Dec. 1988.

5,287,392

INTERNAL PASSIVE WATER RECOMBINER/HYDROGEN PEROXIDE DECOMPOSER FOR A BOILING WATER REACTOR

FIELD OF THE INVENTION

This invention relates to reducing the corrosion potential of components exposed to high-temperature water. As used herein, the term "high-temperature water" means water having a temperature of about 150° C. or greater, steam, or the condensate thereof. High-temperature water can be found in a variety of known apparatus, such as water deaerators, nuclear reactors, and in steam-driven central station power generation.

BACKGROUND OF THE INVENTION

Nuclear reactors are used in central-station electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor, and about 15 MPa and 320° C. for a pressurized water reactor. The materials used in both boiling water and pressurized water reactors must withstand various loading, environmental and radiation conditions.

Some of the materials exposed to high-temperature water include carbon steel, alloy steel, stainless steel, nickel-based alloys, and cobalt-based alloys. Despite the careful selection and treatment of these materials for use in water reactors, corrosion occurs on the materials exposed to the high-temperature water. Such corrosion contributes to a variety of problems, e.g., stress corrosion cracking, sticking of pressure relief valves, buildup of the gamma radiation emitting $^{60}Co$ isotope and erosion corrosion.

Stress corrosion cracking is a known phenomenon occurring in reactor components, such as structural members, piping, fasteners, and welds, exposed to high-temperature water. As used herein, the term "stress corrosion cracking" (hereinafter "SCC") means cracking propagated by static or dynamic stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

It is well known that SCC occurs at higher rates when oxygen is present in the reactor water in concentrations of about 5 parts per billion (ppb) or greater. Stress corrosion cracking is further increased in a high radiation flux where oxidizing species, such as oxygen, hydrogen peroxide, and short-lived radicals are produced from radiolytic decomposition of the reactor water. Such oxidizing species increase the electrochemical corrosion potential of metals. Electrochemical corrosion is caused by a flow of electrons from anodic and cathodic areas on metallic surfaces. The corrosion potential is a measure of the thermodynamic tendency for corrosion phenomena to occur, and is a fundamental parameter in determining rates of, e.g., SCC, corrosion fatigue, corrosion film thickening, and general corrosion.

Stress corrosion cracking in boiling water nuclear reactors and the associated water circulation piping has historically been reduced by injecting hydrogen in the water circulated therein. The injected hydrogen reduces oxidizing species in the water, such as dissolved oxygen, and as a result lowers the corrosion potential of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the corrosion potential below a critical potential required for protection from SCC in high-temperature water. As used herein, the term "critical potential" means a corrosion potential at or below a range of values of about −230 to −300 mV based on the standard hydrogen electrode (she) scale for the case of pure water. Stress corrosion cracking proceeds at an accelerated rate in systems in which the electrochemical potential is above the critical potential, and at a substantially lower rate in systems in which the electrochemical potential is below the critical potential. Water containing oxidizing species such as oxygen increases the corrosion potential of metals exposed to the water above the critical potential, whereas water with little or no oxidizing species present results in corrosion potentials below the critical potential.

In a boiling water reactor (BWR), the radiolysis of the primary water coolant in the reactor core causes the net decomposition of a small fraction of the water to the chemical products $H_2$, $H_2O_2$ and $O_2$. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote SCC of susceptible materials of construction. One method employed to mitigate SCC of susceptible material is called hydrogen water chemistry, whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water. The rate of these recombination reactions is dependent on local radiation fields, flow rates and other variables.

Corrosion potentials of stainless steels in contact with reactor water containing oxidizing species can be reduced below the critical potential by injection of hydrogen into the water in a concentration of about 50 to 100 ppb or greater. For adequate feedwater hydrogen addition rates, the conditions necessary to inhibit SCC can be established in certain locations of the reactor. These conditions are an electrochemical potential of less than −0.230 $V_{she}$. Different locations in the reaction system require different levels of hydrogen addition, as shown in FIG. 2. Much higher hydrogen injection levels are necessary to reduce the corrosion potential within the high radiation flux of the reactor core, or when oxidizing cationic impurities, e.g., cupric ion, are present.

However, feedwater hydrogen additions, e.g., of about 200 ppb or greater, that reduce the corrosion potential below the critical potential, can result in a higher radiation level in the steam-driven turbine section from incorporation of the short-lived $^{16}N$ species, as shown in FIG. 3. For most BWRs, the amount of hydrogen addition required to provide mitigation of SCC of pressure vessel internal components results in an increase in the main steam line radiation monitor ("MSLRM") by a factor of greater than about four. This increase in main steam line radiation can cause high, even unacceptable, environmental dose rates that can require expensive investments in shielding and radiation exposure control.

Accordingly, although the addition of hydrogen lowers the corrosion potential of reactor water, it is also desirable to limit the amount of hydrogen in reactor water, while maintaining the corrosion potential below the critical potential.

The primary products of water radiolysis in the core are $H_2$, $H_2O_2$, OH, H and the hydrated electron. In irradiated water, $O_2$ and $H_2O_2$ are in a state of dynamic equilibrium. During HWC, the computed ratio of $H_2O_2$ to $O_2$ in the downcomer annulus is large. The reason reported by M. Ullberg et al., "Hydrogen Peroxide in BWRs", Water Chemistry for Nuclear Reactor Systems 4, BNES, London, 1987, pp. 67-73, is that the $H_2$ added during HWC initially slows down the oxidation of $H_2O_2$ to $O_2$, speeds up the reduction of $O_2$ to $H_2O_2$ and has little effect on the reduction of $H_2O_2$ to $H_2O$. Thus, hydrogen peroxide is relatively stable in the recirculation water of a BWR.

It is further known from the Ullberg et al. article that $H_2O_2$ in water will decompose on a heterogeneous solid surface at elevated temperatures by the reaction:

$$2H_2O_2 + Surface \rightarrow 2H_2O + O_2$$

This decomposition of $H_2O_2$ is referred to as heterogeneous decomposition. The rate of decomposition can be increased through the use of decomposition catalysts and will also be dependent on the temperature and the ratio of surface area to volume.

SUMMARY OF THE INVENTION

The present invention improves upon the conventional BWR operated in accordance with the HWC principle by incorporating a passive structure immediately downstream of the steam separator assembly which catalyzes the decomposition of hydrogen peroxide only or which catalyzes both the decomposition of hydrogen peroxide and the recombination of water. The only difference in the structure of the respective catalyzers is that the catalyzing structure which recombines water includes a water recombination catalyst, such as a noble metal, whereas the catalyzing structure which decomposes hydrogen peroxide without recombining water includes no water recombination catalyst.

The present invention improves upon known HWC techniques by allowing the achievement of specified conditions at key locations in the reactor system by addition of relatively lower levels of hydrogen to the feedwater. Thus, he negative side effect of high main steam line radiation increase can be avoided. In addition, the amount of hydrogen required and associated costs will be reduced significantly.

One preferred embodiment of the invention is a passive recombiner operating in the water phase of the BWR vessel immediately downstream of the steam/water separator location. This recombiner comprises a catalytic material arranged and situated in an open structure having a high surface area-to-volume ratio such that all (except perhaps a small leakage flow) water phase exiting the steam/water separator device flows over the surface of the catalytic material. The catalytic recombining surfaces react with the water radiolysis product species $H_2$, $O_2$ and $H_2O_2$ in the liquid phase to reform water in accordance with reactions such as (but not limited to) the following:

$$2H_2 + O_2 \xrightarrow{Catalyst} 2H_2O \qquad (1)$$

$$H_2O_2 + H_2 \xrightarrow{Catalyst} 2H_2O \qquad (2)$$

$$2H_2O_2 \xrightarrow{Catalyst} 2H_2O + O_2 \qquad (3)$$

Reaction (3) is followed by reaction (1) to produce water.

The passive catalytic recombiner of the invention is constructed to ensure that the pressure drop of the reactor water across the device is very small (less than 5 psi). In addition, the catalytic material must be corrosion resistant in pure water under BWR conditions and have structural strength at reactor temperatures. The recombiner includes a stainless steel flow-through housing packed with catalytic recombiner material, which could take the form of tangled wire or strips, crimped ribbon, porous sintered metal composite, a honeycomb structure or any other structure having a high surface area-to-volume ratio. The preferred catalytic recombiner material is stainless steel plated or alloyed with a noble metal.

In accordance with another preferred embodiment of the invention, a passive catalytic decomposer is provided in a conventional BWR by installing the same flow-through structure as that used for the recombiner, except that the material making up the high surface area-to-volume structure does not incorporate a water recombination catalyst. The decomposer is made of a solid material having surfaces which cause heterogeneous decomposition of hydrogen peroxide, but which do not catalyze water recombination. The preferred catalytic decomposer material is stainless steel because of its predictable performance in a BWR environment. However, other solid materials which cause heterogeneous decomposition and which have structural strength and corrosion resistance suitable for the BWR environment can be used. The catalytic surfaces of the decomposer react with the water radiolysis product $H_2O_2$ in the liquid phase to decompose $H_2O_2$ in accordance with reaction (3).

BRIEF DESCRIPTION OF THE DRAWINGS

The preferred embodiments of the invention will now be described in detail in conjunction with the drawings, wherein.

DETAILED DESCRIPTION OF THE PREFERRED EMBODIMENTS

Figure 1:
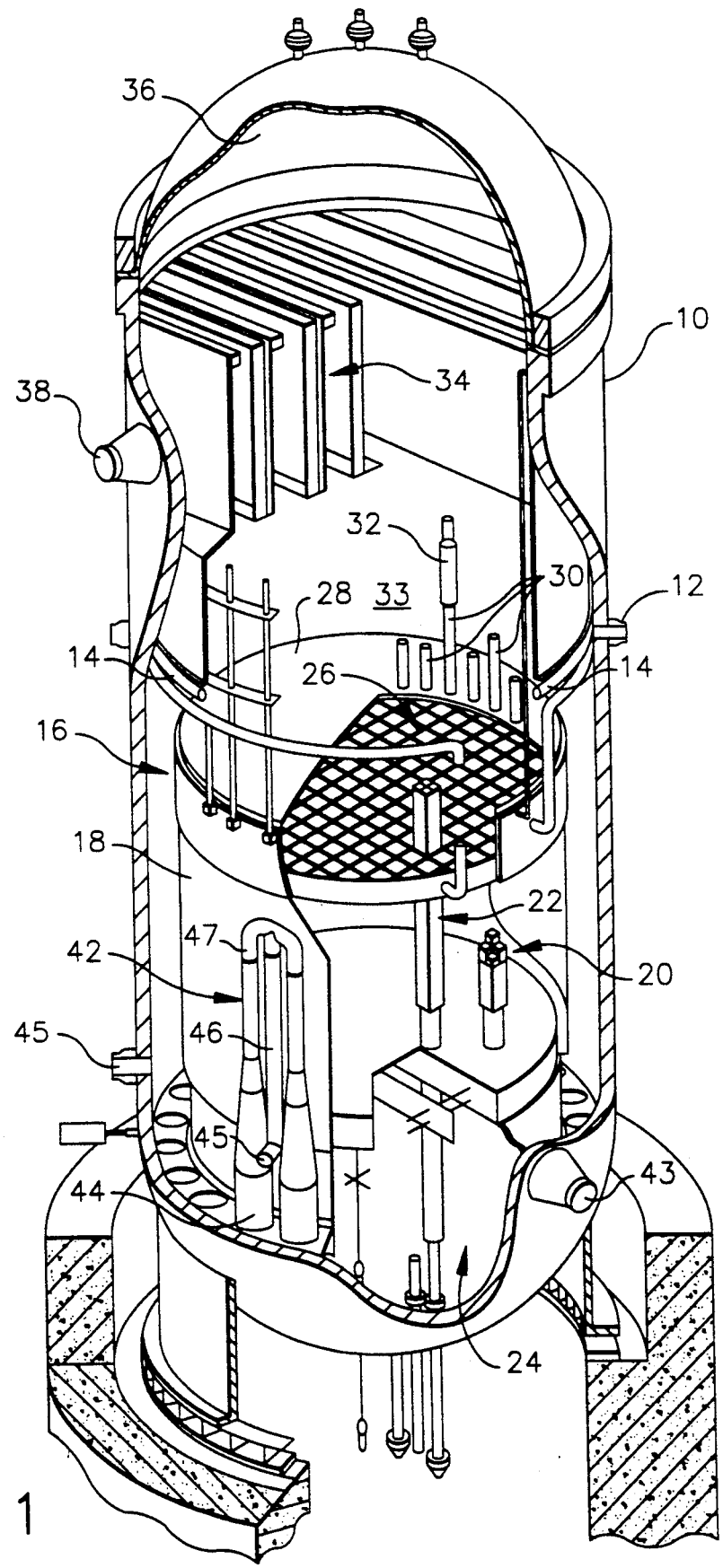
FIG. 1 is a schematic showing a partially cutaway perspective view of a conventional BWR.
Figure 2:
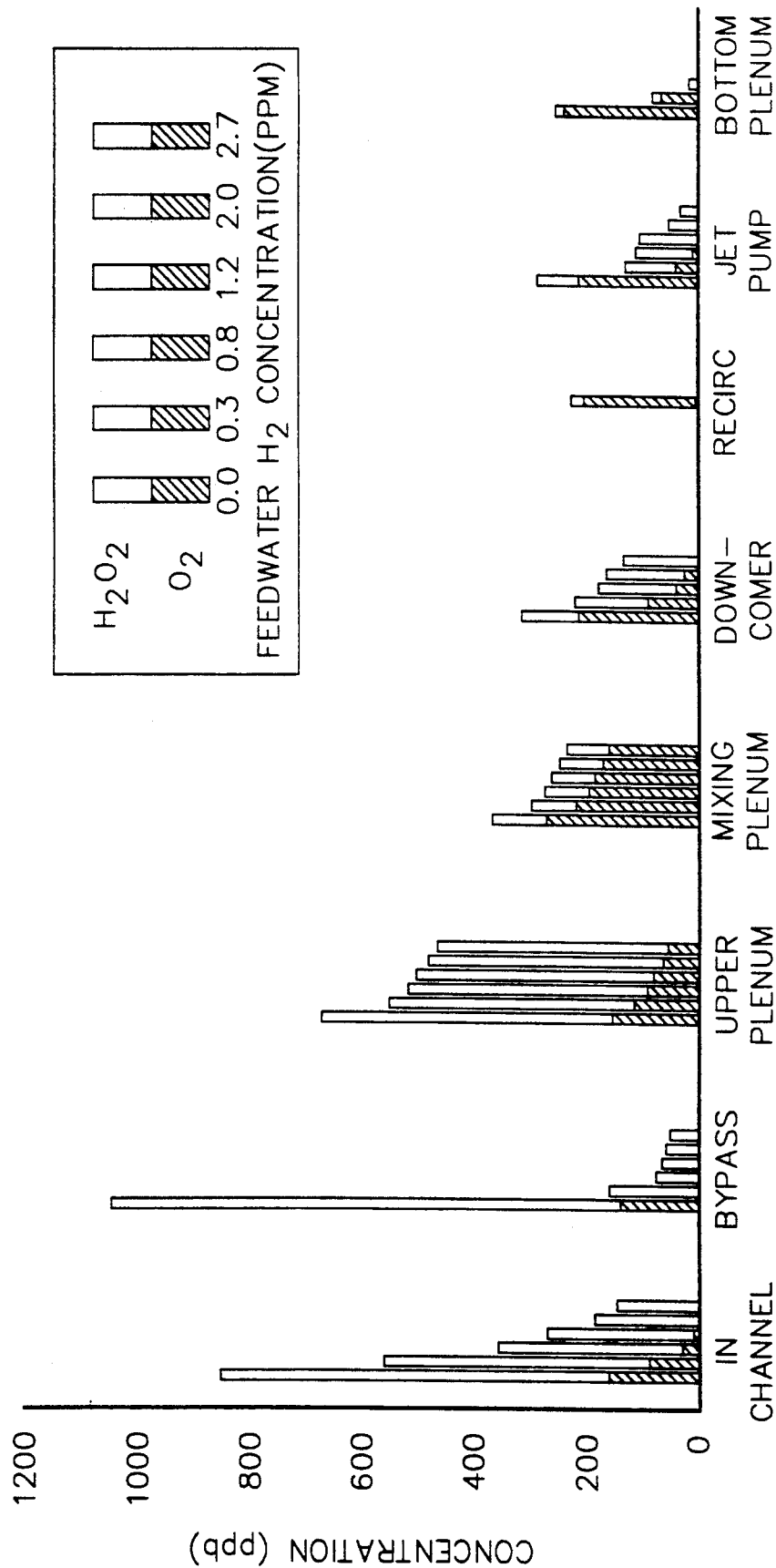
FIG. 2 is a graph showing calculated $O_2$ and $H_2O_2$ concentrations for various locations in a conventional BWR as a function of the concentration of $H_2$ added to the feedwater.
Figure 3:
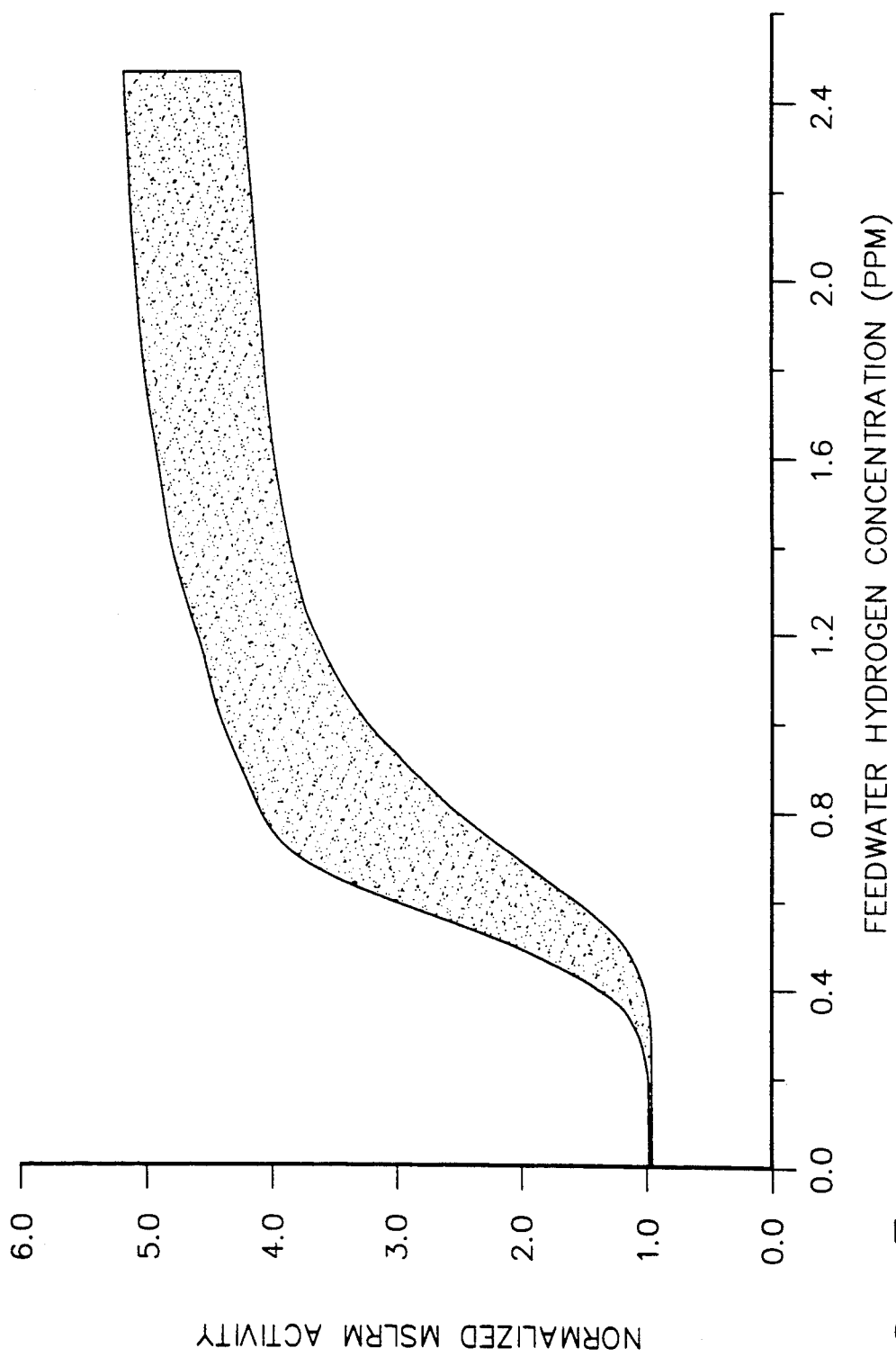
FIG. 3 is a graph in which the operating dose rate is plotted against the feedwater hydrogen concentration for a conventional BWR.

The fluid flow in a boiling water reactor will be generally described with reference to FIG. 1. Feedwater is admitted into reactor pressure vessel (RPV) 10 via an inlet 12. Inlet 12 is connected to feedwater sparger 14, which is a ring-shaped pipe having suitable apertures through which the feedwater is distributed inside the RPV.

The feedwater from sparger 14 flows downwardly through the downcomer annulus 16, which is an annular region between the RPV and core shroud 18. Core shroud 18 is a stainless steel cylinder which surrounds the core 20 (only one fuel assembly 22 of which is depicted in FIG. 1) and separates the upward flow of coolant through the core from the downward flow in downcomer annulus 16.

The water flowing through downcomer annulus 16 then flows to the core lower plenum 24. The water subsequently enters the fuel assemblies 22 disposed within core 20, wherein a boiling boundary layer (not shown) is established, thus causing a lower non-boiling region and an upper boiling region within the fuel assemblies.

Next, a mixture of water and steam enters core upper plenum 26 which is formed within shroud head 28 and disposed atop core 20. Core upper plenum 26 provides stand-off between the steam-water mixture exiting core 20 and entering vertical standpipes 30, the latter being disposed atop shroud head 28 and in fluid communication with core upper plenum 26.

Each standpipe 30 is in fluid communication with a steam separator 32 mounted thereon. The steam-water mixture flowing through standpipes 30 enters steam separators 32, which are of the axial-flow centrifugal type. These separators separate the liquid water from the steam by employing a swirling motion to drive the water droplets to the outer wall of the separator. The separated liquid water then mixes with feedwater in the mixing plenum 33, which mixture then flows to the core via the downcomer annulus. The liquid water elevation or level established within the RPV during normal operation of the BWR is designated by numeral 50 in FIG. 4. The steam passes through steam dryers 34 and enters steam dome 36. The steam is withdrawn from the RPV via steam outlet 38.

The BWR also includes a coolant recirculation system which provides the forced convection flow through the core necessary to achieve the required power density. In some, but not all BWRs, a portion of the water is sucked from the lower end of the downcomer annulus 16 via outlet 43 and forced by a centrifugal recirculation pump 40 (see FIG. 4) into jet pump assemblies 42 via inlet 45. This type of BWR also has two recirculation pumps, each of which provides the driving flow for a plurality of jet pump assemblies. As best seen in FIG. 1, the pressurized driving water is supplied to a jet pump nozzle 44 by an inlet riser 46 via elbow 48.

In accordance with the invention, the passive recombiner must be located in a hydrogen-rich region. Hydrogen injection is via the feedwater spargers. Thus, the recombiner must be located between the steam separators and the jet pumps, preferably immediately downstream of the steam water separator assembly of the BWR shown in FIG. 1. Two locations were studied. The first location is attached to the shroud head, so that it is removed when the shroud head is removed. The second location is attached to the shroud above the jet pumps, which would require the ability to periodically remove the recombiner for access to the jet pumps. It is estimated that access to the jet pump annulus is required approximately every second refueling outage.

Figure 4:
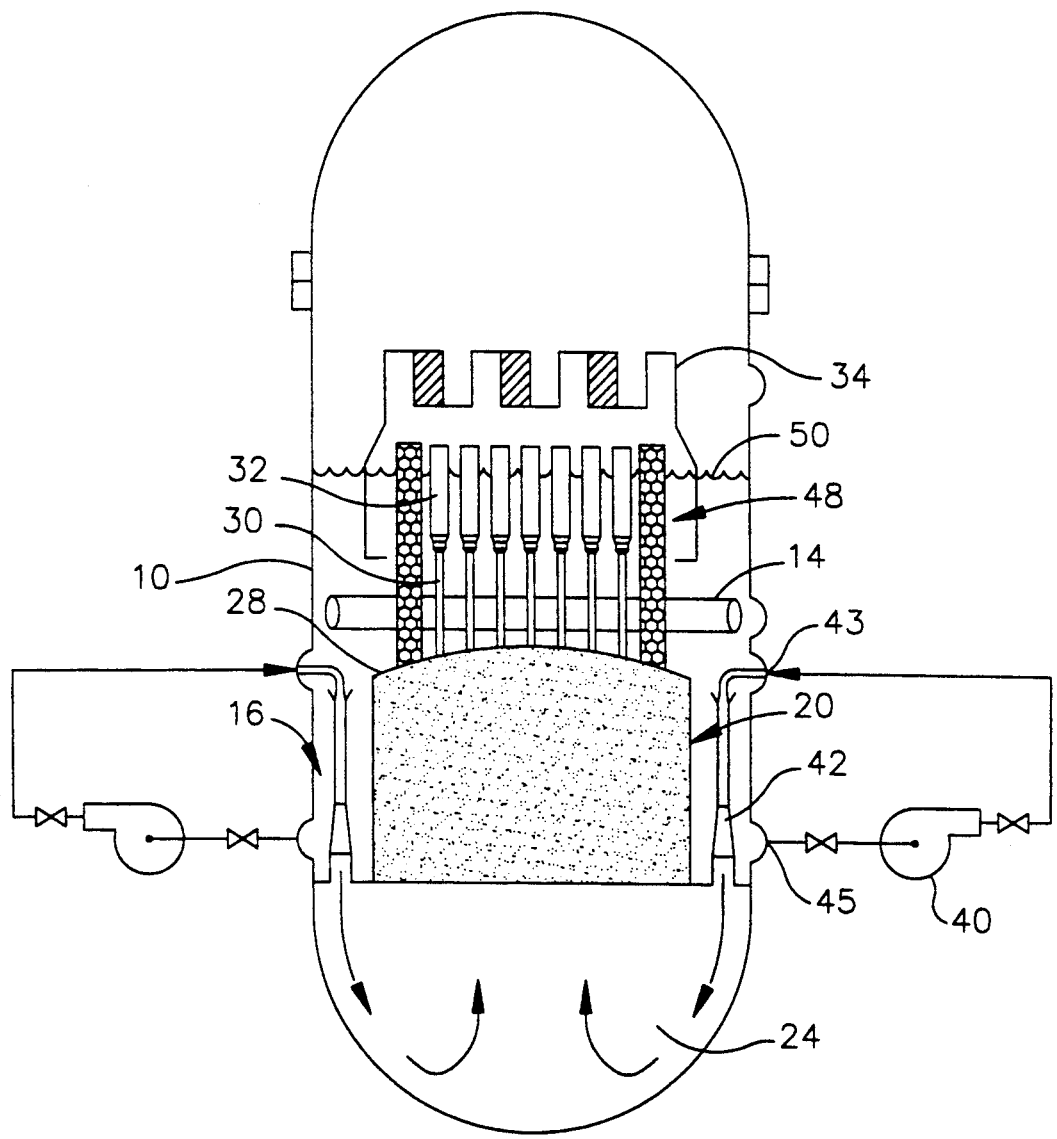
FIG. 4 is a schematic showing a catalytic device installed in a BWR in accordance with the preferred embodiment of the invention.
Figure 6:
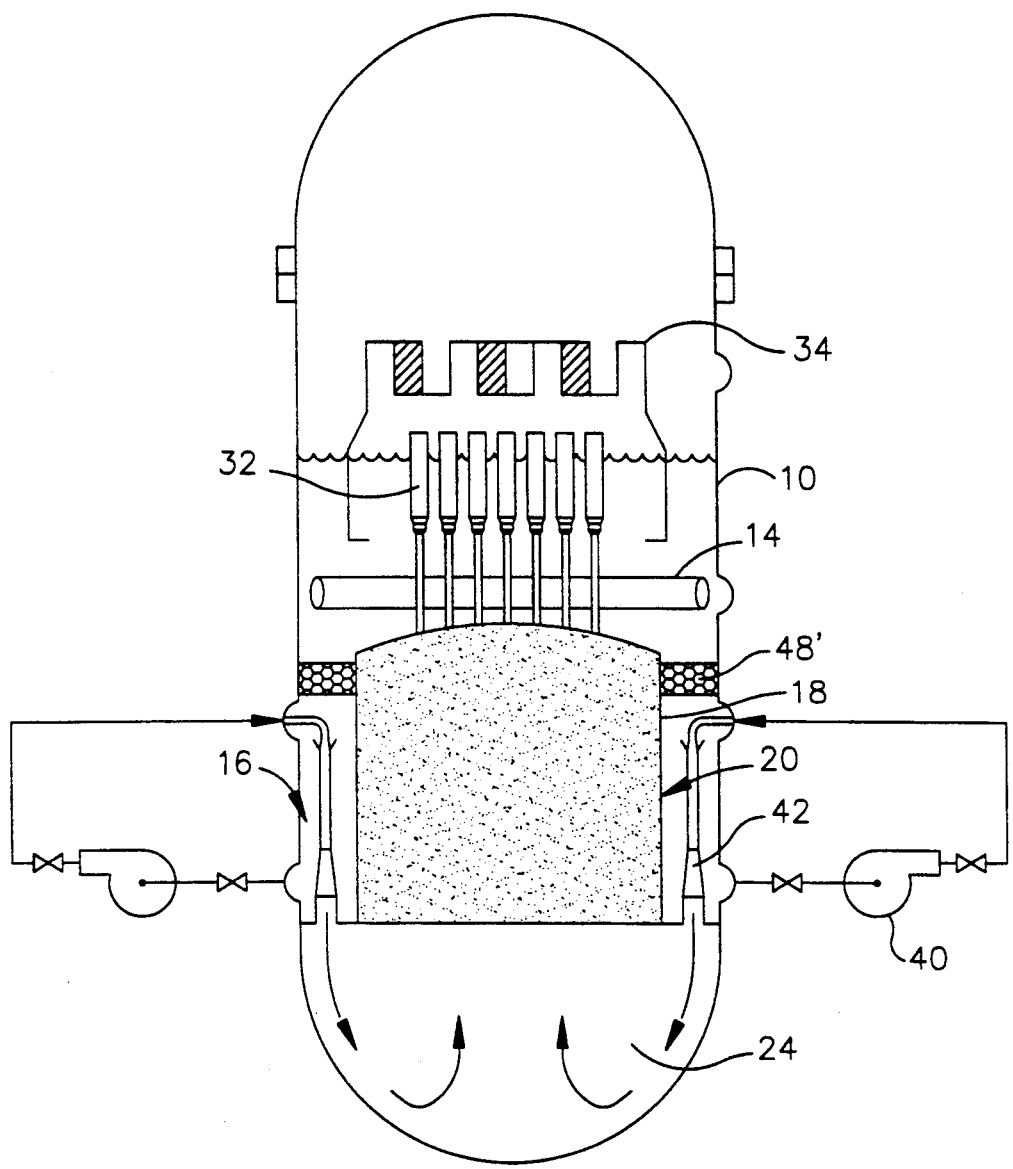
FIG. 6 is a schematic showing a catalytic device installed in a BWR in accordance with another preferred embodiment of the invention.

In accordance with a first preferred embodiment of the invention, the recombiner, generally designated by 48 in FIG. 4, has a generally annular configuration and is mounted on the shroud head 28. In accordance with a second preferred embodiment, the recombiner, generally designated by 48' in FIG. 6, is mounted on shroud 28 and located in the downcomer annulus 16 (above the jet pumps for BWRs which have them). FIGS. 4 and 6 respectively depict a cross section of such generally annular recombiners. The honeycombed hatching is intended to symbolize an arrangement in which catalytic material is packed into and held in place by a stiffened metal mesh housing. The catalytic recombiner material packed inside the housing should have a high surface area-to-volume ratio and could take the form of tangled wire or foil strips, crimped ribbon, porous sintered metal composite, a honeycombed structure or any other structure having a high surface area-to-volume ratio. Other geometries would be suitable.

The catalytic material could, for example, be platinum or palladium deposited on a stainless steel substrate; a noble metal-doped alloy of stainless steel (or other proven reactor structural material doped with noble metal); or a commercially available noble metal catalytic material. The catalytic material may be formed as a coating on a substrate, or as a solute in an alloy formed into the substrate, the coating or solute being sufficient to catalyze the recombination of oxidizing and reducing species at the surface of the substrate. The preferred catalytic materials are platinum, palladium, osmium, ruthenium, iridium, rhodium, and mixtures thereof, whereas the preferred substrate is stainless steel.

The formation of a catalytic layer of a noble metal on an alloy catalyzes the recombination of reducing species, such as hydrogen, with oxidizing species, such as oxygen or hydrogen peroxide, that are present in the water of a BWR. The surface of the recombiner structure also inherently catalyzes the decomposition of hydrogen peroxide via heterogeneous decomposition. Such catalytic action at the surface of the alloy can lower the corrosion potential of the alloy below the critical o corrosion potential where SCC is minimized. As a result, the efficacy of hydrogen additions to high-temperature water in lowering the electrochemical potential of components made from the alloy and exposed to the injected water is increased manyfold. The key requirement of the catalytic material is that it must perform at reactor operating temperatures of 288° C. in the water phase.

Current laboratory data suggests that catalytic recombination of $H_2$ and $O_2$ or of $H_2$ and $H_2O_2$ only occurs effectively when there is a stoichiometric excess of hydrogen. The $H_2O_2$ produced in the core is generally nonvolatile. While the $H_2$ and $O_2$ partition in the steam separators to go into the steam, the $H_2O_2$ stays in the liquid and gets recirculated. Because of the differences of Henry's Law for $H_2$ and $H_2O_2$, the water exiting the steam separator may be sub-stoichiometric for the molar ratio of $H_2$ to $(O_2+H_2O_2)$. Because of this effect, it may be necessary to have some hydrogen-containing feedwater mix with the water exiting the separation assembly before it enters the recombiner. This can be accomplished by placement of the recombiner downstream of the location where feedwater enters the vessel, as in the embodiment of FIG. 6, or by injecting the feedwater over, around and through the recombiner.

Figure 5:
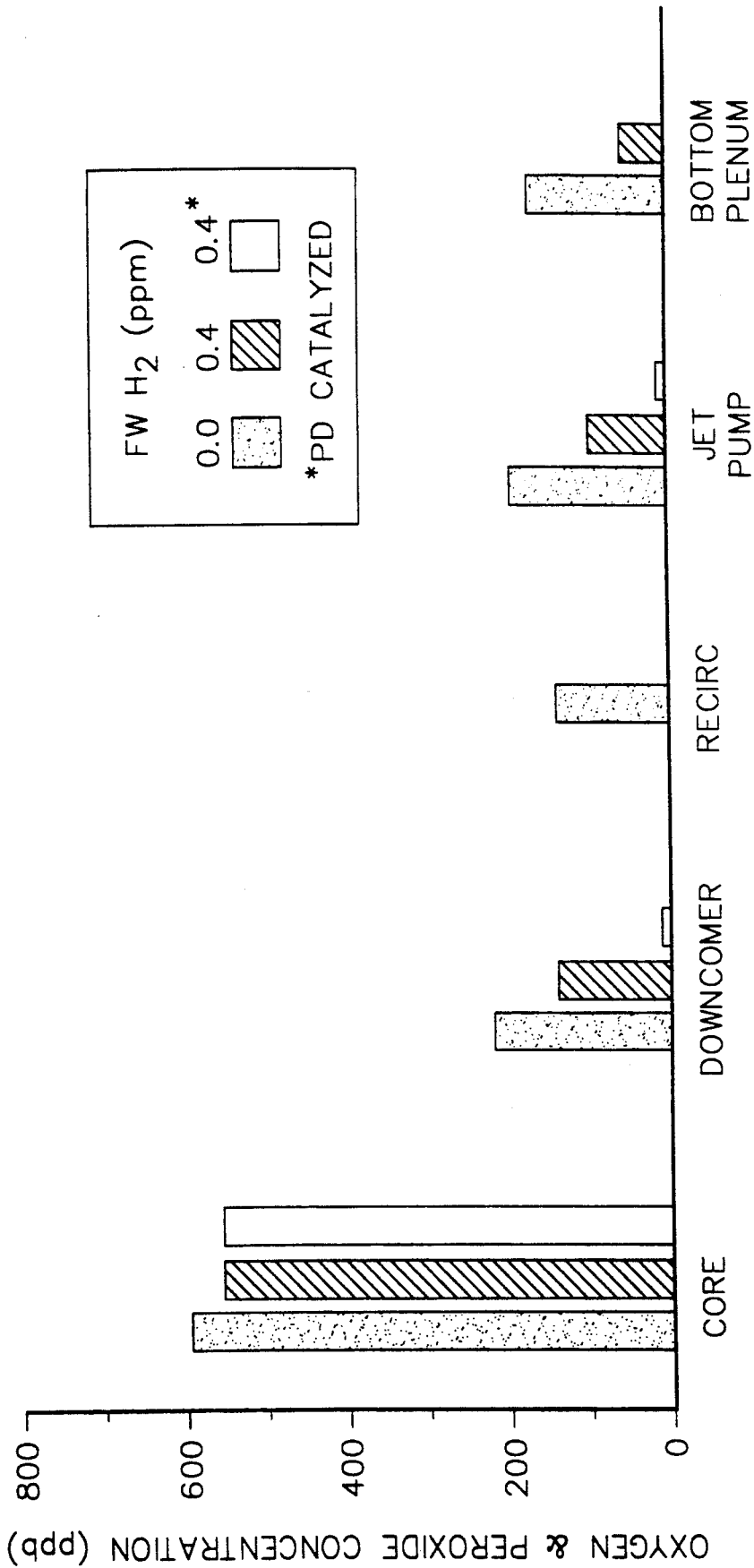
FIG. 5 is a graph showing calculated $O_2$ plus $H_2O_2$ concentrations for various locations in a BWR as a function of both the concentration of $H_2$ added to the feedwater and the presence of a recombination catalyzer in accordance with the invention.

The typical residence time for water passing through the recombiner will be a few seconds or less. A calculation of the effectiveness of the passive catalytic recombiner using a radiolysis model is shown in FIG. 5. The calculation predicts that conditions for preventing SCC (i.e., $O_2+H_2O_2<2$ ppb) can be achieved with feedwater hydrogen injection rates (i.e., about 0.4 ppm) below rates which cause significant increases in the main steam line radiation level.

The major advantages of shroud head attachment are that the recombiner can be installed in the separator pool and that the recombiner is removed with the shroud head during refuelings. Also, attachment to the shroud is disadvantageous because it requires many individual pieces to fill the cross-sectional area of the downcomer annulus. Therefore attachment to the shroud head is preferred for most BWRs. However, differences in geometry and design may dictate that attachment to the shroud is preferred for some BWRs.

The minimum size of a piece of the recombiner material should be a strip 0.012 inch thick by 12.0 inches long. The minimum thickness of any component currently used in the RPV is 0.012 inches as part of the fuel spacers. Therefore this thickness was chosen from the recombiner strips. The concern for small thicknesses is that pieces could break off and become lodged in the fuel assemblies where they could cause local hot spots. The minimum length of 12 inches was selected to prevent a piece from traversing the path from the control rod guide tube to the fuel rods.

The width requirements are more subjective. A reasonable minimum width of 0.25 inch was selected based on fabrication concerns. A piece of this size can be formed into any required shape to facilitate packing.

The total weight of a recombiner attached to the shroud head will be approximately 12,000 to 20,000 pounds. The weight of a 251-inch RPV shroud head is approximately 125,000 pounds. The weight of a recombiner was estimated by assuming that 90% of the recombiner volume would be open and 10% would be solid metal. Thus, the recombiner weighs approximately 50 pounds per cubic foot of recombiner volume plus the weight of the support structure. The support structure is expected to add approximately 5000 pounds.

Figure 7:
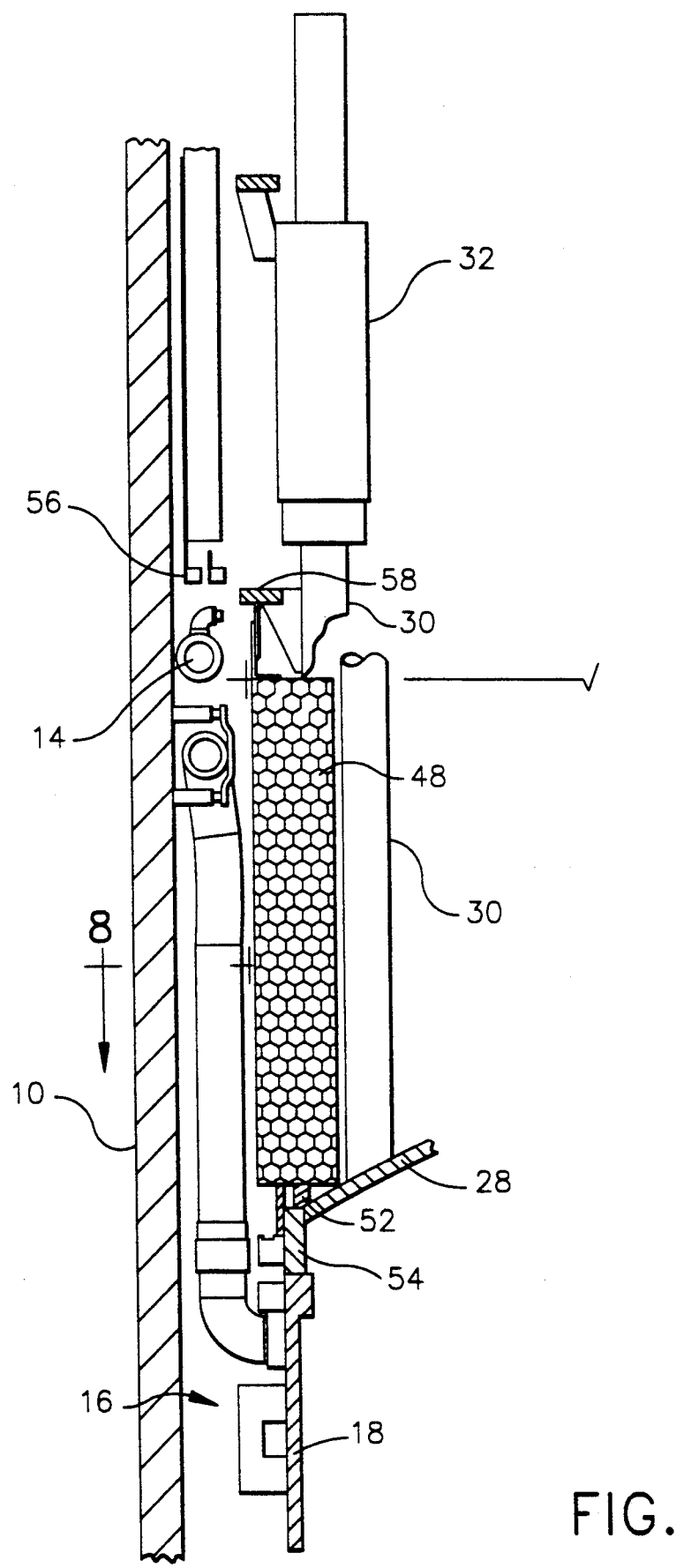
FIG. 7 is a sectional view showing in greater detail attachment of the catalytic device to the shroud head in accordance with the preferred embodiment of FIG. 4.
Figure 8:
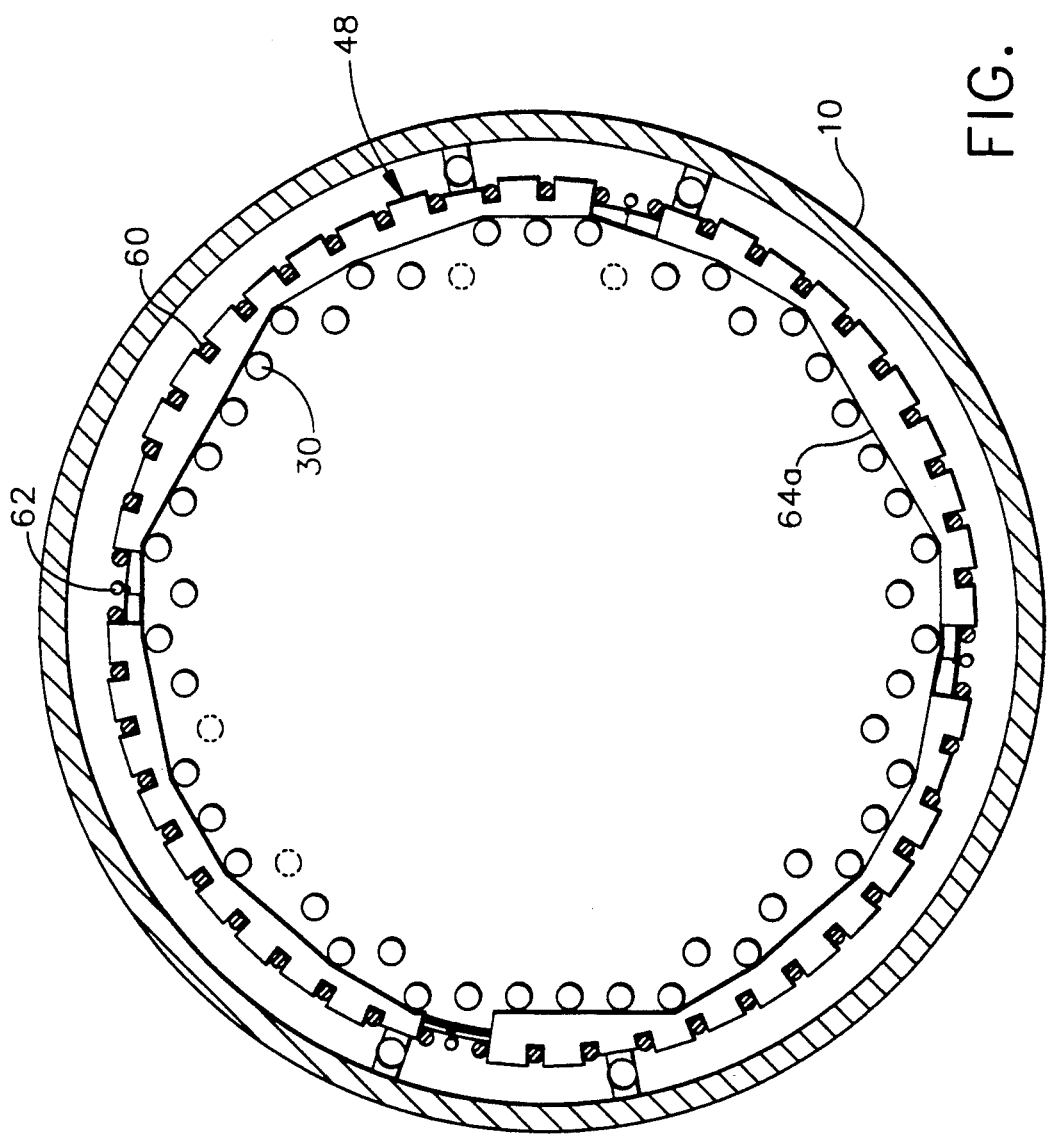
FIG. 8 is a plan view of the catalytic device shown in part in FIG. 7.
Figure 9:
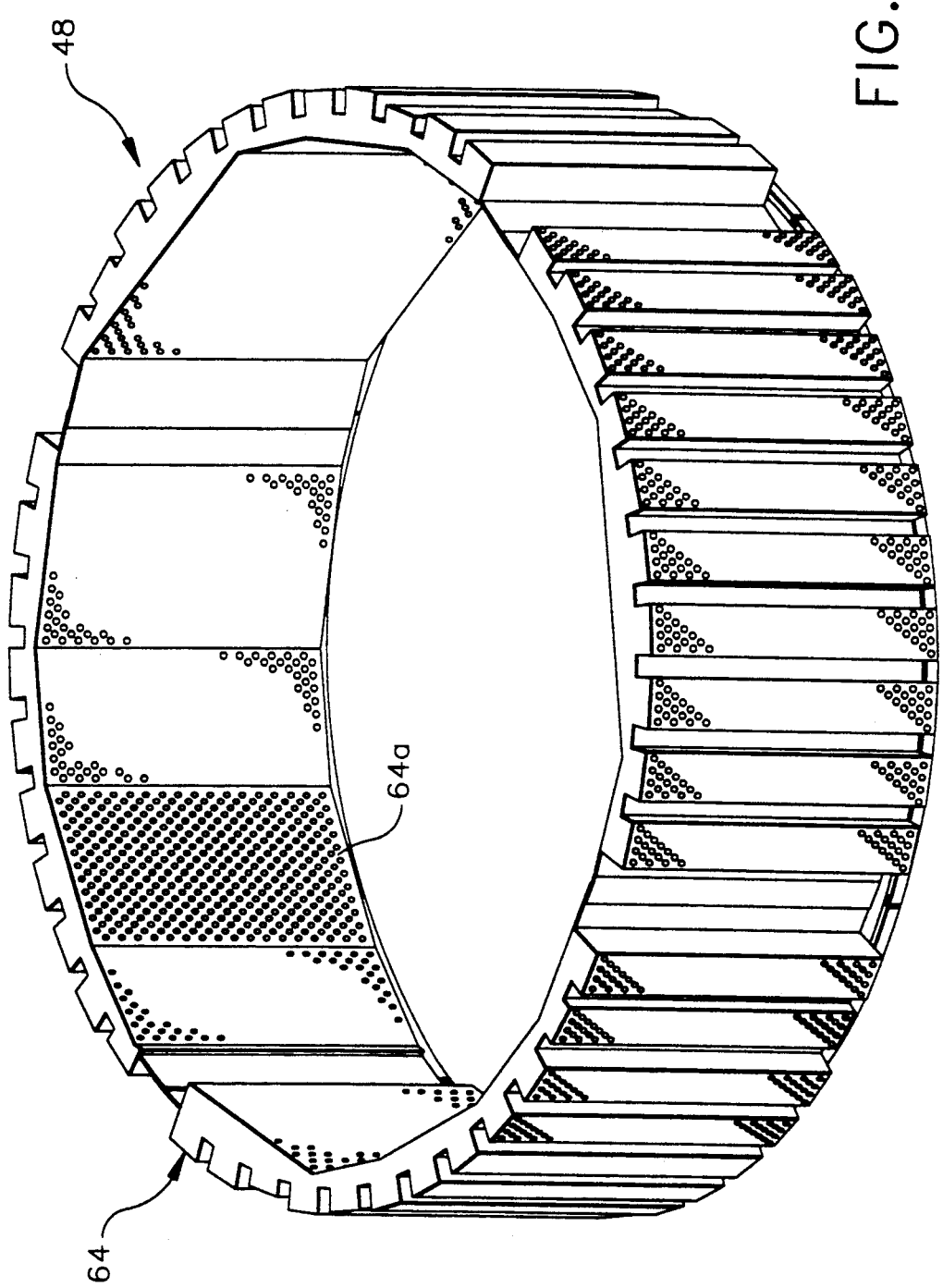
FIG. 9 is an isometric view of the main part of the catalytic device shown in part in FIG. 7.

A specific design for a recombiner mounted on the shroud head is shown in FIGS. 7 through 9. The inside height of the recombiner 48 will be approximately 72.9 inches. The recombiner structure is supported by a ring 52 which rests on the top of the shroud head flange 54. The ring is attached to the shroud head flange with brackets and bolts. There will be a small amount of leakage past the recombiner at the bottom inside edge. Proper design will cause the feedwater to force all the flow from the steam dryer drain channels 56 into the separator array and then through the recombiner.

The recombiner includes a stainless steel flow-through housing packed with catalytic recombiner material, which could take the form of tangled wire or foil strips, crimped ribbon, porous sintered metal composite, a honeycombed structure or any other structure having a high surface area-to-volume ratio. As best seen in FIG. 8, the recombiner is generally annular in shape and has inner and outer circumferential walls of complex configuration. These walls have small holes which allow water to flow-through.

FIG. 8 shows how the recombiner 48 fits outside of the separator standpipes 30 and around the shroud head bolts 60. The minimum flow path through the recombiner varies around the circumference from approximately 6 inches to approximately 13 inches. The flow is prevented from taking a shorter flow path by eliminating outlet holes in selected portions of the outer circumferential wall. The recombiner shown in FIG. 8 would be installed in four major pieces, which would bolt together behind the four shroud head lifting rods 62. No flow would go through these four regions. The top of the recombiner would be attached to the shroud head lower bolt ring 58 with brackets and bolts (not shown). There is a minimum of 2 inches of clearance between the recombiner and any part of the reactor assembly that is stationary.

The inside volume of the recombiner shown in FIG. 8 is approximately 206 ft$^3$. The flow area through the recombiner is approximately 320 ft$^2$. The average residence time of the water in the recombiner is approximately one-quarter of a second, assuming a 6-inch flow path.

FIG. 9 shows the geometric configuration of the recombiner housing 64 in an isometric view. All planar wall panel of the inner circumferential wall of housing 64 have a plurality of small holes, as shown for panel 64a, to allow flow-through of the liquid from the steam separation assembly. Although only shown incompletely, the outer flow-through panels are also provided with similar holes. The holes are sufficiently small to prevent escape of the catalytic material packed inside the housing. As previously described, the housing may take the form of a stiffened metal mesh with catalytic recombiner material packed inside the housing. Preferably, the catalytic recombiner material is tangled wire plated with catalytic material, or crimped ribbons or tangled strips made of alloy doped with catalytic material.

The preferred embodiments of the hydrogen peroxide decomposer of the invention will have the same structure as is depicted in FIGS. 4 and 6-9. The only difference is that the high surface area-to-volume structure will not be doped or coated with a water recombination catalyst.

The preferred catalytic decomposer material is stainless steel because of its predictable performance in a BWR environment. However, other solid materials which cause heterogeneous decomposition and which have structural strength and corrosion resistance suitable for the BWR environment can be used. The key requirement of the catalytic decomposer material is that it must perform at reactor operating temperatures of 288° C, in the water phase.

The $H_2O_2$ produced in the core is generally nonvolatile. While the $H_2$ and $O_2$ partition in the steam separators to go into the steam, the $H_2O_2$ stays in the liquid and recirculates through the decomposer. The typical residence time for water passing through the decomposer will be a few seconds or less. Upon passage of this recirculated water through the catalytic decomposer of the invention, hydrogen peroxide is decomposed.

The resulting reactor water entering the vessel downcomer annulus will be very low in $H_2O_2$ as compared to the level when a decomposer is not used. The net effect of this reduction in the $H_2O_2$ concentration will be a decrease in the amount of hydrogen which must be added to the feedwater to establish the low levels of $(O_2+H_2O_2)$ which result in corrosion potentials below the critical potential and thus protect against SCC.

The specific embodiment shown in FIGS. 7 through 9 has been described in detail for the purpose of illustration only. Practitioners of ordinary skill in the art of nuclear reactor engineering will recognize that the geometry and location of the catalytic device in accordance with the invention will depend on the specific design of the BWR in which the device is to be installed. In accordance with the invention, however, the recombiner/decomposer catalytic device for any given type of BWR must be designed to ensure that virtually all water phase exiting the steam/water separator device flows over the surface of the catalytic material.

We claim:

1. In a nuclear reactor comprising a core of nuclear fuel elements, a downcomer annulus between a pressure vessel and said core, means for feeding feedwater into said pressure vessel, means for forcing said feedwater to flow through said core to cool said fuel elements, and means for separating steam and water phase in the mixture exiting said core, said water phase flowing from said steam/water separating means to said downcomer annulus, the improvement wherein catalytic means are arranged downstream of said steam/water separating means, said catalytic means comprising catalytic material arranged in an open structure which allows water phase to flow therethrough, said catalytic means being disposed so that substantially all of the water phase exiting said steam/water separating means flows therethrough, and said catalytic material having a surface area-to-volume ratio sufficiently high enough to ensure that substantially all of the water phase passing through said catalytic means flows close enough to a surface of said catalytic material to enable said catalytic material to catalyze the decomposition of hydrogen peroxide molecules dissolved in said water phase exiting said steam/water separating means into water and oxygen molecules.

2. The nuclear reactor as defined in claim 1, wherein said catalytic material comprises a water recombination catalyst which catalyzes both the decomposition of hydrogen peroxide molecules and the recombination into water of hydrogen and oxygen molecules dissolved in said water phase exiting said steam/water separating means.

3. The nuclear reactor as defined in claim 1, wherein said catalytic means comprise a generally annular containment means in which said catalytic material is packed, said containment means having openings which enable water phase to flow through said containment means, but which are not of a size to allow escape of said catalytic material therefrom.

4. The nuclear reactor as defined in claim 3, further comprising a core shroud and a shroud head, wherein said catalytic means is mounted on said shroud head and circumferentially encompasses said steam/water separating means.

5. The nuclear reactor as defined in claim 3, further comprising a core shroud and a shroud head, wherein said catalytic means is mounted on said core shroud and extends across said downcomer annulus.

6. The nuclear reactor as defined in claim 1, wherein said catalytic material comprises entangled wires or strips or crimped ribbons made from metal.

7. The nuclear reactor as defined in claim 6, wherein said metal is stainless steel plated or alloyed with a noble metal.

8. A nuclear reactor comprising a core of nuclear fuel elements, a downcomer annulus between a pressure vessel and said core, means for feeding feedwater into said pressure vessel, means for forcing said feedwater to flow through said core to cool said fuel elements, means for separating steam and water phase in the mixture exiting said core, said water phase flowing from said steam/water separating means to said downcomer annulus, and means for catalyzing the recombination into water of hydrogen and oxygen molecules dissolved in said water phase exiting the steam/water separating means, wherein said means for catalyzing water recombination are arranged downstream of said steam/water separating means and comprise catalytic material arranged in an open structure which allows water phase to flow therethrough, said means for catalyzing water recombination being disposed so that substantially all of the water phase exiting the steam/water separating means flows therethrough.

9. The nuclear reactor as defined in claim 8, wherein said means for catalyzing water recombination comprise containment means in which said catalytic material is packed, said containment means having openings which enable water phase to flow through said containment means, but which are not of a size to allow escape of said catalytic material therefrom.

10. The nuclear reactor as defined in claim 8, wherein said means for catalyzing water recombination has a generally annular structure.

11. The nuclear reactor as defined in claim 10, further comprising a core shroud and a shroud head, wherein said means for catalyzing water recombination is mounted on said shroud head and circumferentially encompasses said steam/water separating means.

12. The nuclear reactor as defined in claim 10, further comprising a core shroud and a shroud head, wherein said means for catalyzing water recombination is mounted on said shroud and extends across said downcomer annulus.

13. The nuclear reactor as defined in claim 9, wherein said catalytic material comprises entangled or crimped stainless steel plated or alloyed with a noble metal.

* * * * *